(12) United States Patent
Harrison et al.

(10) Patent No.: US 6,707,913 B1
(45) Date of Patent: Mar. 16, 2004

(54) NETWORK INTERFACE

(75) Inventors: Warner Harrison, Medfield, MA (US); John W. Lovell, Sherborn, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/546,584

(22) Filed: Apr. 11, 2000

(51) Int. Cl.$^7$ ................................................ H04M 1/00
(52) U.S. Cl. ............................ 379/413.02; 379/399.01
(58) Field of Search .................... 379/399.01, 93.14, 379/93.15, 413.02, 413.03, 413.04

(56) References Cited

U.S. PATENT DOCUMENTS

| | | | | |
|---|---|---|---|---|
| 4,769,833 A | * | 9/1988 | Farleigh et al. | 379/93.01 |
| 5,479,202 A | * | 12/1995 | Beriont | 348/7 |

\* cited by examiner

*Primary Examiner*—Rexford Barnie
(74) *Attorney, Agent, or Firm*—Leonard C. Suchyta, Esq.

(57) ABSTRACT

A telephone network interface device that provides at least two drop-wire connection ports and two distribution cable ports. One drop wire port provides full bandwidth service with the second port providing telephone service only, reducing radio frequency ingress and egress magnitudes. Bridging options allow limited bandwidth or full bandwidth communication between distribution cable ports.

12 Claims, 3 Drawing Sheets

NETWORK INTERFACE

BACKGROUND OF THE INVENTION

1. Field of the Invention

This invention pertains in general to a telephone distribution network and, more particularly, to a telephone network interface device for connection with a telephone distribution cable and a drop wire service.

2. Description of the Related Art

Utilization of the high frequency spectrum in telephone cables has become practical with high speed modems that combat distortions attributed to the physical construction of the cables and cable topologies. While much of the telephone distribution cable in use today is physically constructed such that radiation of Radio Frequencies (RF) from the cable can be controlled through installation and maintenance practice, drop wires, or the connection from the telephone distribution cable to customer premises, and customer premise wiring does not provide the same controlled environment and thus expose the telephone network to noise ingress from multiple sources. The drop and in-house wiring may also radiate high frequency signals that would otherwise be contained within the telephone network distribution cables. The egress and previously mentioned ingress are undesirable.

Therefore, while providing for normal operations of a telephone network for voice-band frequencies and below, there is a need to prevent a drop wire or in-home wiring from radiating high frequency signals. There is also a need to prevent high frequency noise energy present on such wiring from entering the controlled environment of the distribution cable.

SUMMARY OF THE INVENTION

Accordingly, the present invention is directed to a network interface device that substantially obviates one or more of the problems due to limitations and disadvantages of the related art.

To achieve these and other advantages, and in accordance with the purpose of the invention as embodied and broadly described, there is provided a telephone frequency network interface that includes a first network device having high input impedance receiving broadband signals including voice band signals from a telephone network and a second set of signals having frequencies higher than the voice band signals from a first drop wire terminating at a first customer premise, the first network device transmitting only the voice band signals to a first interface port, the first interface port coupled the first network device and a second drop wire terminating at a second customer premise for providing the voice band signals to the drop wire, a second network device having high input impedance coupled to the first network device and the first interface port, the second drop wire providing a third set of signals having frequencies higher than the voice band signals, the second network device attenuating the third set of signals.

In one aspect of the invention, the first network device and the second network device are selectable to transmit the broadband signals.

Also in accordance with the present invention, there is provided a telephone frequency network interface that includes a first interface port receiving a first set of signals from a telephone network, a second interface port, a third interface port, a first network device having high input impedance including a first device port coupled to the first interface port, and a second device port coupled to the second interface port, where the first network device attenuates signals having frequencies high than that of the first set of signals, and a second network device having high input impedance including a first device port coupled to the second interface port and the second device port of the first network device, and a second device port coupled to the third interface port.

In one aspect of the invention, the second network device is configured as an open circuit.

In another aspect of the invention, the first interface port is coupled to a first drop wire to receive a second set of signals having frequencies higher than the first set of signals, the first network device attenuating the second set of signals and preventing the second set of signals from being transmitted to the second interface port or the third interface port.

In yet another aspect of the invention, the second interface port is coupled to a second drop wire and receives a third set of signals having frequencies higher than the first set of signals, and the second network device attenuates the third set of signals and prevents the third set of signals from being transmitted to the third interface port.

Additionally in accordance with the present invention, there is provided a telephone frequency network interface that includes a first network device configured as a filter receiving a first set of signals from a telephone network and a second set of signals having frequencies higher than the first set of signals from a digital subscriber line service, the first network device having high input impedance and attenuating the second set of signals, the first network device providing an output including only the first set of signals, a second network device configured as a filter coupled to the first network device for receiving the output of the first network device, and a first drop wire coupled between the first network device and the second network device receiving only the first set of signals.

In one aspect of the invention, the first network device and the second network device are selectable such that the second network device providing an output including the first set of signals and the second set of signals.

Also in accordance with the present invention, there is provided a telephone frequency network interface method that includes providing a first network device configured as a filter, receiving a first set of signals from a telephone network, receiving a second set of signals having frequencies higher than the first set of signals, and providing a second network device configured as a filter coupled to the first network device, the second network device receiving from the first network device either a first output including only the first set of signals, or a second output including both the first set of signals and the second set of signals.

Additional features and advantages of the invention will be set forth in the description which follows, and in part will be apparent from the description, or may be learned by practice of the invention. The objectives and other advantages of the invention will be realized and attained by the structures and methods particularly pointed out in the written description and claims thereof, as well as the appended drawings.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF THE PREFERRED EMBODIMENTS

In accordance with the present invention, there is provided a three-port frequency network interface, which may be selectable, implemented in a telephone metallic pair distribution network. Specially, the three-port frequency network interface is implemented together with existing telephone distribution cables that transmit broadband signals. Different ports of the three-port frequency network interface allow signals outside the range of normal voice-band signals to be attenuated on a drop wire from the terminal to customer premises. The three-port frequency network interface also includes one or more frequency selective devices.

A first port of the three-port frequency network interface is coupled to the public switched telephone network (PSTN) and any of its embedded high frequency devices, and to a first port of a first frequency selective device. The second port of the first frequency selective device is coupled to a second port of the frequency network interface as well as a first port of a second frequency selective device. The second port of the second frequency selective device is coupled to a third port of the frequency network interface. The third port of the three-port frequency network interface may be coupled to a second telephone distribution cable.

Each of the frequency selective devices has a plurality of electrical connections at multiple points. According to connections selected, each of the frequency selective devices will either allow high frequency signals to propagate between a drop wire and a distribution cable or block their propagation while allowing standard voice-band signals to be transmitted between the distribution cables. At the same time, high frequency signals from conductors bridged across the network loop or attenuated (interfering) reflections from the end of the distribution cable, such as those originating from a bridged tap, are filtered. In addition, bridging connections across the filter will be implemented to allow high frequencies to pass the frequency selective devices with minimum attenuation.

In operation, the first frequency selective device passes plain old telephone service (POTS) signals and blocks signals and noise at higher frequencies by providing high input impedance above the band of frequencies used by POTS. The second frequency selective device provides a similar filter function, presenting high impedance to signal frequencies above those used by POTS at the third port of the three-port frequency network interface. In one embodiment, the first and second frequency selective devices prevent high frequency signals and noises present on the drop wire connected to both the first and the second frequency selective devices from entering the distribution cables coupled to the first and third ports.

Figure 1:
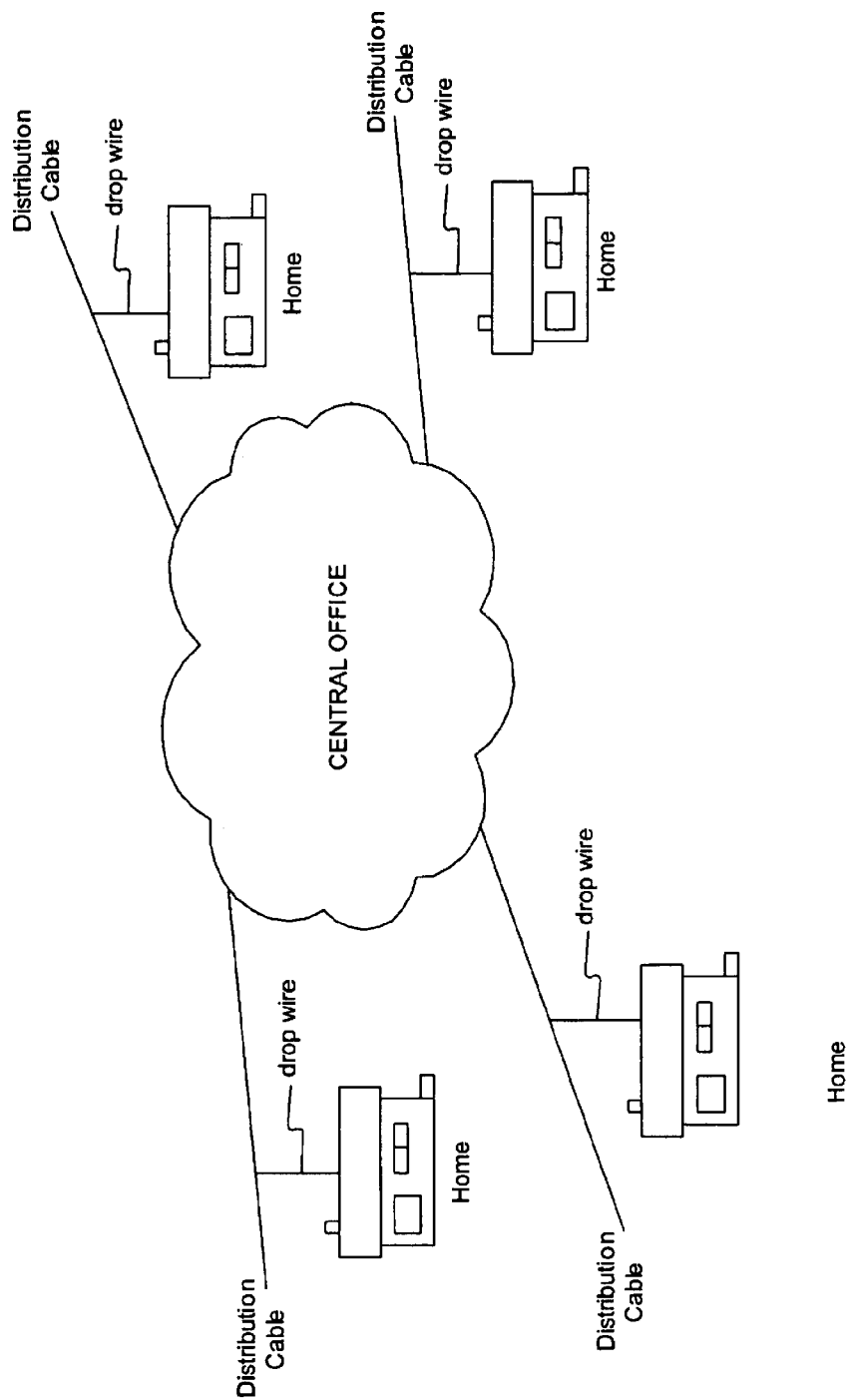
FIG. 1 shows a telephone network that provides services to homes.

FIG. 1 shows a telephone network that provides services to homes. The telephone network is centered around the Central Office. Signals from the Central Office or other signal distribution nodes are transmitted to a variety of localities through distribution cables. Services to homes may be accomplished by connecting a drop wire from one of the distribution cables to a customer premise. The network interface of the present invention may be implemented at the junction between the distribution cable and the drop wire.

Figure 2:
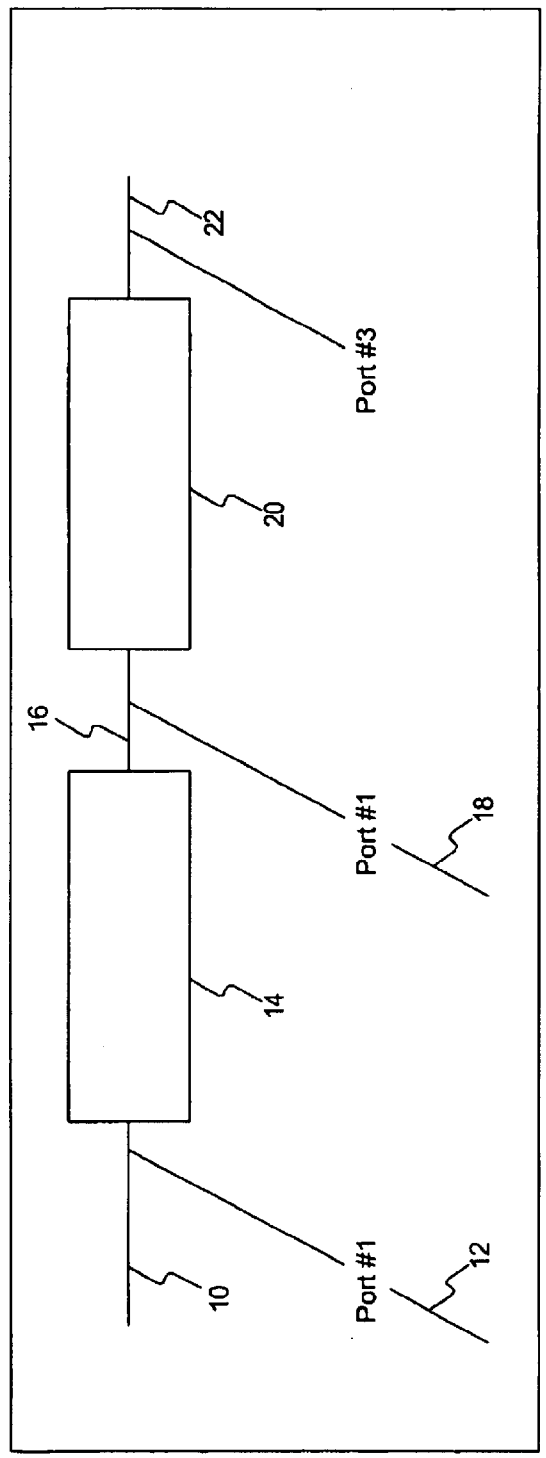
FIG. 2 is a block diagram of one embodiment of the network interface constructed in accordance with the present invention.

FIG. 2 is a block diagram of one embodiment of the three-port frequency network interface constructed in accordance with the present invention. Referring to FIG. 2, an input signal including both low frequency signals such as voice-band signals and high frequency signals such as those from digital subscriber line (VDSL and ADSL) services is provided from a source (not numbered), such as the Central Office, through a first distribution cable 10. The network interface of the present invention includes three ports, Port #1, Port #2, and Port #3. Port #1 is coupled to first distribution cable 10 and provides broadband input signals to a first drop wire 12. First drop wire 12 may terminate at a customer premise.

A first frequency selective device 14, configured as a band stop filter in one embodiment, is coupled to first distribution cable 10, to receive the input signal from the source. First frequency selective device 14 has high input impedance and attenuates signals above voice frequencies at the Port #1 interface. First frequency selective device 14 provides an output to an interconnect 16. Port #2 couples to interconnect 16 to provide voice-band signals to a second drop wire 18. A second frequency selective device 20, configured as a band pass filter in one embodiment, is coupled to interconnect 16 on the one end and to Port #3 at the other end to provide an output to a second distribution cable 22. Second frequency selective device 20 has high input impedance above voice frequencies.

In addition, broadband drop wire services such as one provided by first drop wire 12 are adequately isolated and shielded at customer premises such that high frequency interference that may be generated at the customer premises is generally not a concern. However, high frequency signals may be present on each of Port #2 and Port #3 from sources such as in-home communications networks and amateur radio operations. Such high frequency signals may interfere with the operations of the telephone network.

In operation, first drop wire 12 may conceptually be considered as connected to the source through Port #1 and therefore receives a broadband transmission from the source. Because first frequency selective device 14 attenuates signals having frequencies above voice-band signals, Port #2 provides only voice-band signals to second drop wire 18. In other words, first frequency selective device 14 attenuates high frequency signals of the input signal and permits only voice-band signals of the input signal to be transmitted to interconnect 16, which in turn provides connectivity to second drop wire 18 through Port #2. If required, frequency selective devices 14 and 20 may be bypassed by connecting Port #1 to Port #3.

The high isolation of first frequency selective device 14 isolates Port #1 and the source from high frequency interferences. Similarly, second frequency selective device 20 isolates Port #2 from high frequency interferences originating from Port #3 and, in effect, isolates Port #1 from Port #3 for such interferences. Low frequency signals including standard voice-band and DC signals pass through both distribution cables 10 and 22. Distribution cables 10 and 22 represent parts of a single distribution cable prior to the implementation of frequency selective devices 14 and 20 in accordance with the present invention.

In one embodiment of the present invention, one or both of frequency selective devices 14 and 20 are configured as low-pass filters having a cutoff frequency determined according to the voice-band signals to be transmitted through the telephone network. In addition, the network interface of the present invention may include a plurality of low-pass filters, with electrical contacts to provide to drop wire services, such as drop wire 18. In another embodiment according to the present invention, a low-pass filter may be mounted at the junctions of a distribution cable and a drop wire to the customer premises in series with the drop wire. Another embodiment includes attachment points for ports in the network to allow drop wires to be connected at any point.

Yet another embodiment implements frequency selective device 14 and electrical contacts for Ports #1, #2, and #3, while second frequency selective device 20 is configured as an open circuit, or an all-block filter. This allows a drop wire to be attached to either Port #1 or Port #2 to bypass selective device 20 such that the telephone network can feed a terminal farther away from the source with the full bandwidth. Alternatively, second frequency selective device 20 can be implemented with the cutoff frequency as that of first frequency selective device 14 to provide symmetry so that either interface may be coupled to the source and receive full bandwidth input signals. This permits a worker in the field to install the network interface of the present invention without having to worry about polarity of the interface. One skilled in the art would understand that the number of interfaces and drop wires described above are for illustrative purposes only and should not be construed to limit the scope of the present invention.

Figure 3:
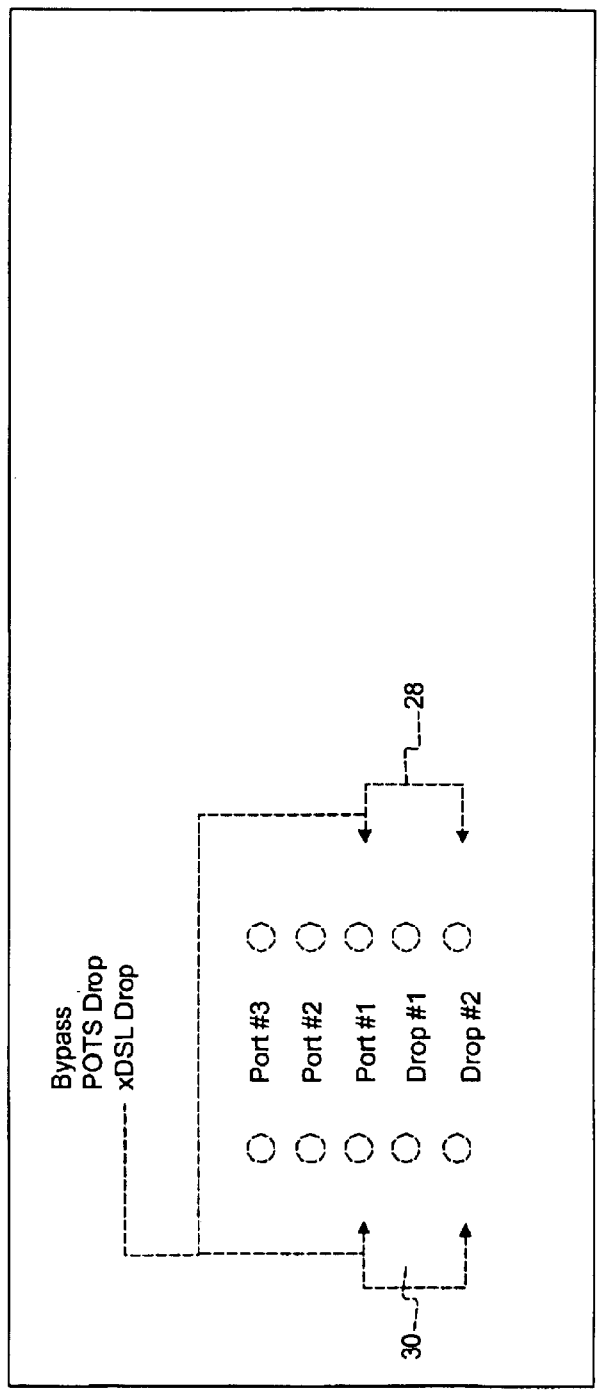
FIG. 3 shows the possible connections of a selectable network interface in accordance with the present invention.

FIG. 3 shows the possible connections of a selectable network interface in accordance with the present invention. Referring to FIG. 3, a switch 28 of a selectable network interface may be used to select a number of different connections. Switch 28 may also be implemented with a jumper cable with fixed spacing. In the topmost position of switch 28, the loop passes through switch 28 and connects Port #1 to Port #3 thereby bypassing drop wires. In the middle position, switch 28 connects Port #2 to Drop Wire #1. In the bottom position, switch 28 connects Port #1 to Drop Wire #2. Additionally, there may be instances where it is desirable to bridge Drop Wire #2 to Drop Wire #1 where only one drop is installed. Switch 30 moves in conjunction with switch 28 to establish connections, which are predetermined and are not limited to the connections described above.

In addition, it will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An interface positioned between a first distribution cable, a second distribution cable, and a plurality of drop wires, said first distribution cable operatively coupled to a signal source for conducting both low frequency signals and high frequency signals supplied from said source, said plurality of drop wires operatively coupled to a customer premise for conducting said low frequency signals and said high frequency signals, said interface comprising:

a first frequency selective device having an input operatively coupled to both said first distribution cable and a first of said plurality of drop wires;

a second frequency selective device having an input operatively coupled from the output of said first frequency selective device and to a second of said plurality of drop wires;

a third of said plurality of drop wires operatively coupled from the output of said second frequency selective device and to said second distribution cable; and said first frequency selective device including means for directing said high frequency signals to said customer premise over said first of said plurality of drop wires and for directing said low frequency signals to both said input to said second frequency selective device and to said second of said plurality of drop wires.

2. The interface of claim 1 wherein said second frequency selective device passes said low frequency signals to said second distribution cable and to said third of said plurality of drop wires.

3. The interface of claim 2 wherein said signal source is a telephone central office.

4. The interface of claim 3 wherein said low frequency signals are voice band signals, said high frequency signals are digital subscriber line signals, and said customer is a telephone customer.

5. The interface of claim 4 further comprising:

a switch for bypassing said first frequency selective device, or for bypassing said second frequency selective device, or for bypassing both said first frequency selective device and said second frequency selective device.

6. The interface of claim 4 wherein high frequency interference generated in said telephone customer premise on said first of said plurality of drop wires is blocked from transmission over said second distribution cable by operation of said first frequency selective device or said second frequency selective device.

7. The interface of claim 6 wherein said first frequency selective device input and output are reversed and high frequency interference generated in said telephone customer premise on said second of said plurality of drop wires is blocked from transmission over said first distribution cable by operation of said first frequency selective device and is blocked from transmission over said second distribution cable by operation of said second frequency selective device.

8. The interface of claim 7 wherein said second frequency selective device input and output are reversed and high frequency interference generated in said customer premise on said third of said plurality of drop wires is blocked from transmission over said first distribution cable by operation of said second frequency selective device or said first frequency selective device.

9. The interface of claim 6 wherein said second distribution cable is removed, said second frequency selective device input and output are reversed and operating characteristics of said first frequency selective device are substantially identical to operating characteristics of said second frequency selective device, whereby said low frequency signals and said high frequency signals coupled to either said first frequency selective device or to said second frequency selective device provide substantially the same output signal on said second of said plurality of drop wires.

10. A method for interfacing with a first distribution cable connected to a telephone central office conducting both low frequency and high frequency signals supplied from said office, a second distribution cable and a plurality of drop wires connected to a telephone customer premise, said method comprising:

directing said high frequency signals to said customer premise over a first of said plurality of drop wires;

directing said low frequency signals to said customer premise over a second of said plurality of drop wires;

suppressing any first high frequency interference generated in said customer premise on said first of said plurality of drop wires by not allowing passage of said first interference to said second drop wire or to said second distribution cable; and suppressing any second high frequency interference generated in said customer premise on said second of said plurality of drop wires by not allowing passage of said second interference to said first drop wire and to both said first distribution cable and said second distribution cable.

11. The method of claim 10 wherein said low frequency signals are further directed to said second distribution cable.

12. The method of claim 11 wherein said low frequency signals are voice band signals and said high frequency signals are digital subscriber line signals.

* * * * *